Figure 1:
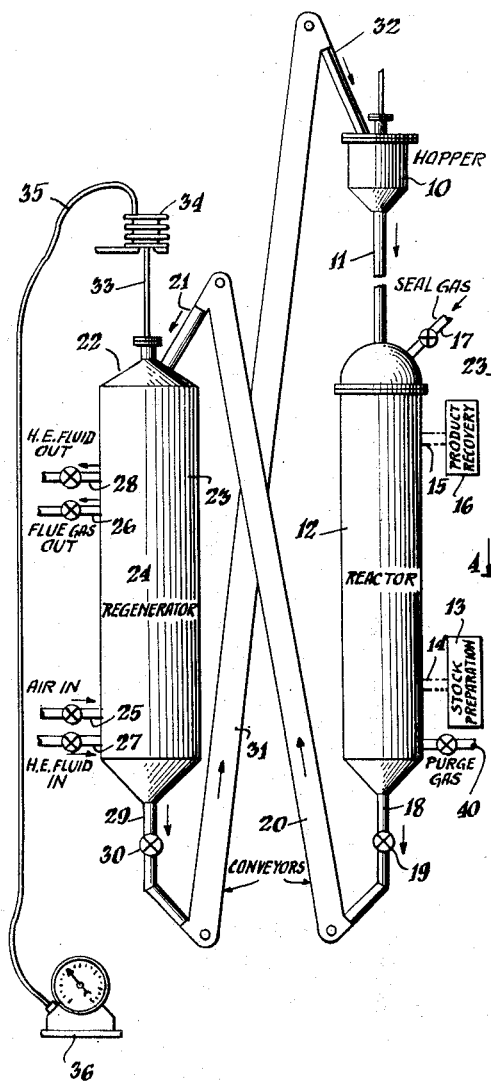

Aug. 4, 1953  E. V. BERGSTROM  2,647,405
CATALYST LEVEL INDICATOR

Filed Dec. 9, 1949  4 Sheets-Sheet 1

INVENTOR.
Eric V. Bergstrom
BY
AGENT OR ATTORNEY

Aug. 4, 1953  E. V. BERGSTROM  2,647,405
CATALYST LEVEL INDICATOR
Filed Dec. 9, 1949  4 Sheets-Sheet 2
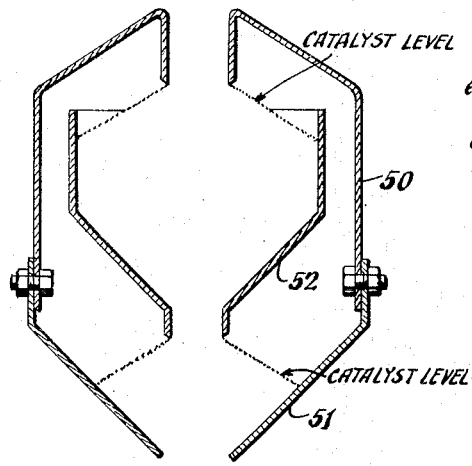
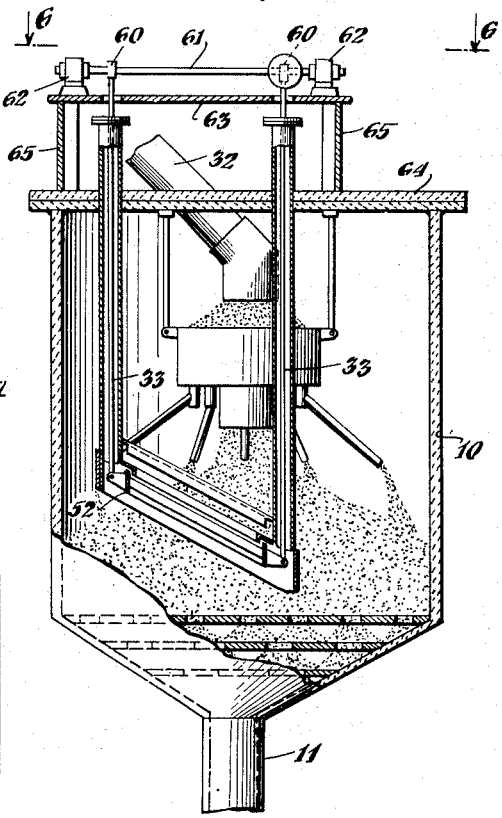
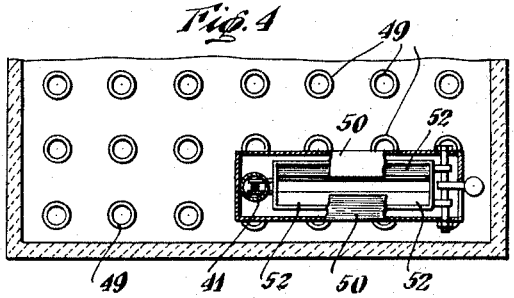
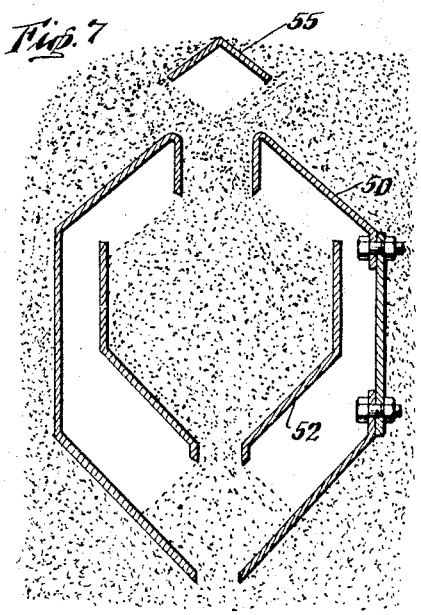
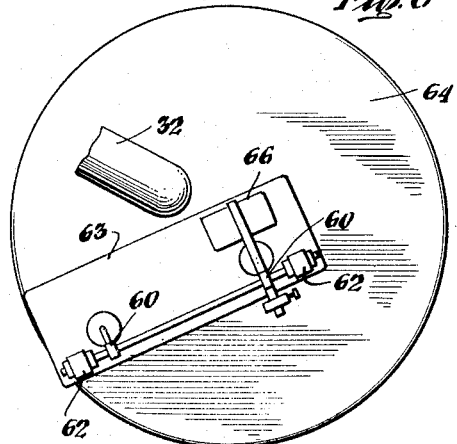
INVENTOR.
*Eric V. Bergstrom*
BY
*Charles G. Huggett*
AGENT OR ATTORNEY

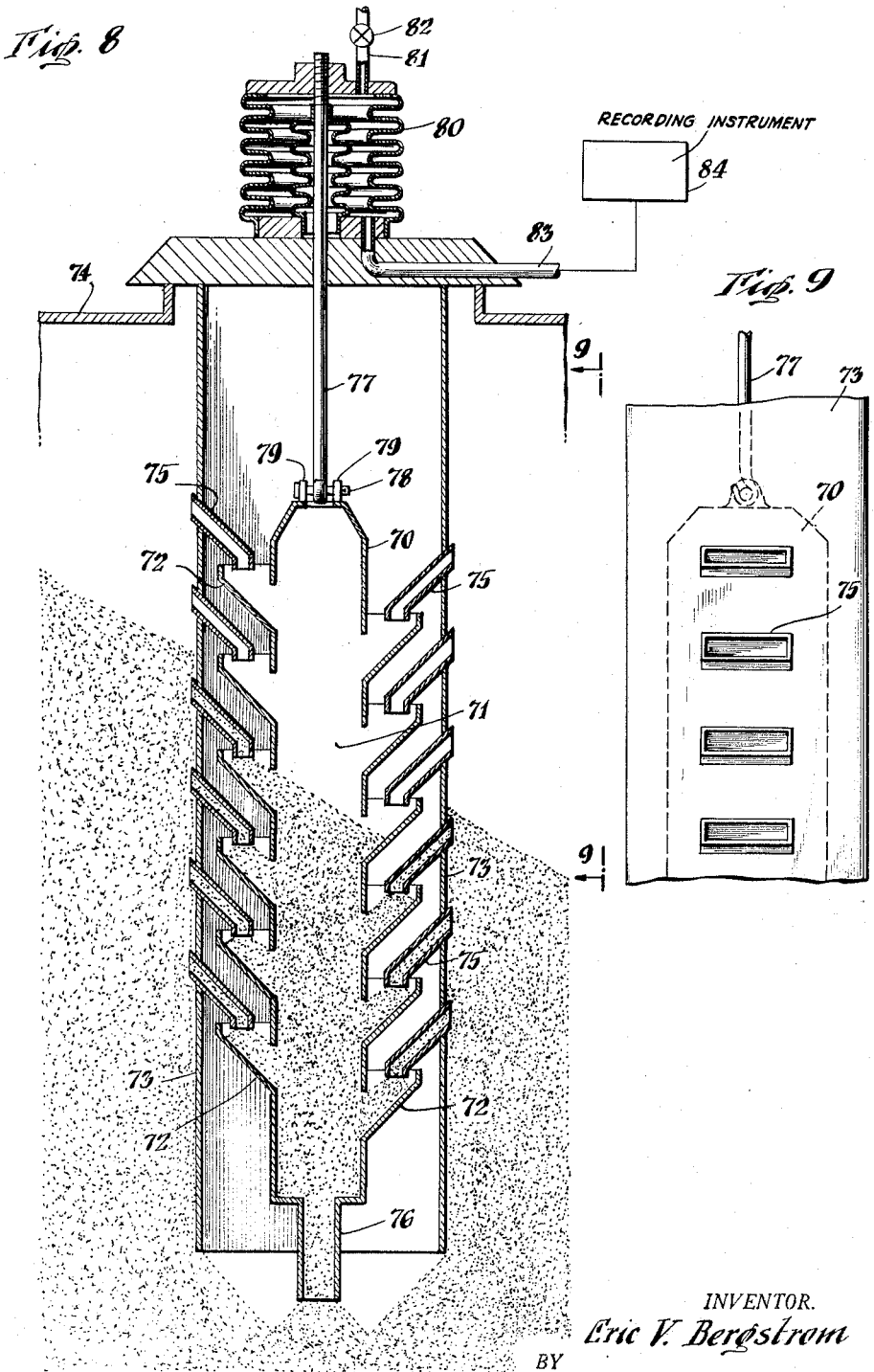

Aug. 4, 1953 E. V. BERGSTROM 2,647,405
CATALYST LEVEL INDICATOR
Filed Dec. 9, 1949 4 Sheets-Sheet 4
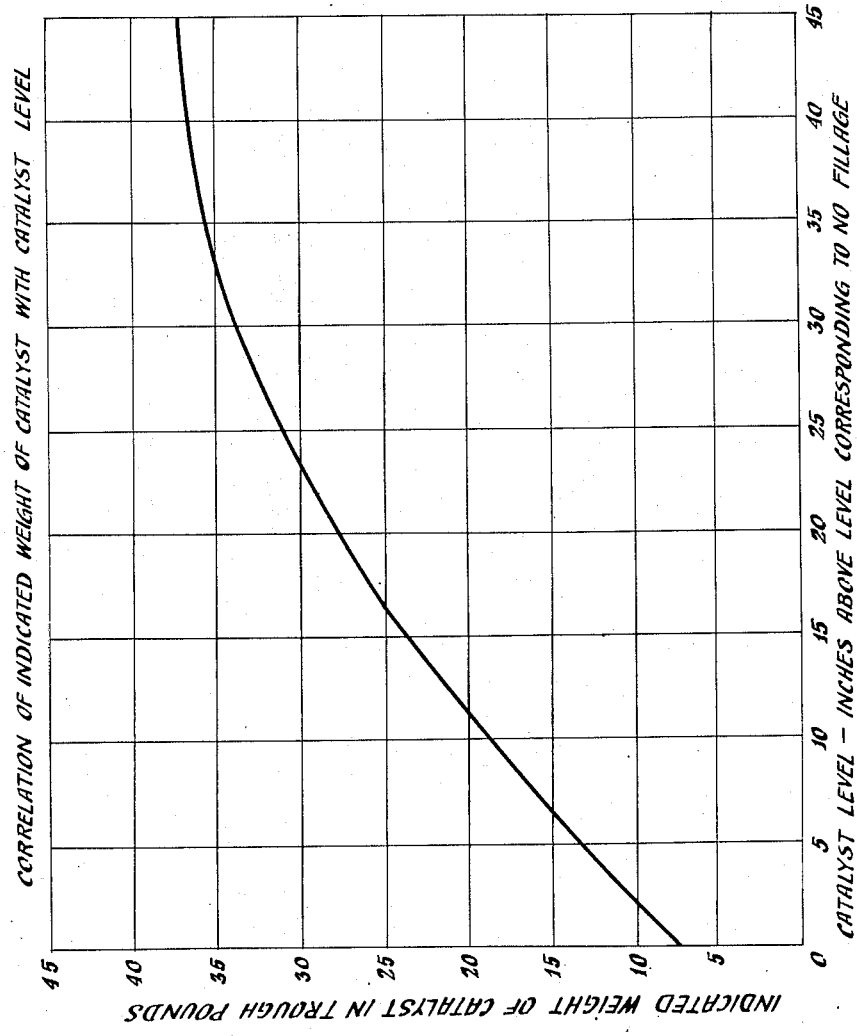
INVENTOR.
*Eric V. Bergstrom*
BY
*Charles A. Huggett*
AGENT OR ATTORNEY Patented Aug. 4, 1953

2,647,405

UNITED STATES PATENT OFFICE 2,647,405

CATALYST LEVEL INDICATOR

Eric V. Bergstrom, Short Hills, N. J., assignor to Socony-Vacuum Oil Company, Incorporated, a corporation of New York Application December 9, 1949, Serial No. 132,068

7 Claims. (Cl. 73—296)

This invention is concerned with moving beds of particle-form solid contact materials which are contacted with fluid reactants. It is more particularly directed to a cyclic system for the conversion of hydrocarbons in the presence of a substantially compact moving column.

In one such system a particle-form contact material is moved downwardly as a substantially compact column through a reaction zone wherein it is contacted with vaporized hydrocarbons to convert them to lower boiling hydrocarbons such as gasoline and then through a regeneration zone wherein it is contacted with combustion supporting gas such as air to burn the carbonaceous material formed on the contact material during the hydrocarbon conversion. This invention relates particularly to a method and means of determining the height of the catalyst column.

In such catalytic moving bed systems the catalyst may partake of the nature of natural or treated clays, synthetic associations of silica, alumina, or silica and alumina or inert carriers bearing deposits of certain metallic oxides and the like. The invention is not considered to be limited to catalytic conversion systems but is intended to cover thermal conversion systems and heat exchange systems and the like, wherein a substantially inert particle-form solid material flows by gravity as a substantially compact column. In such systems the contact material may take the form of particles of refractory material, or even of metal. The size of the particles used may vary over a wide range. For example, in the catalytic cracking of hydrocarbon oils the catalyst particles may desirably fall within the range of about 4 to 20 mesh.

In the catalytic conversion systems for converting heavy hydrocarbons to gasolines the flow of downwardly moving catalyst must be controlled to maintain a predetermined flow and catalyst column level. By controlling the discharge of catalyst from the columns and by other means the system may be maintained in a substantially balanced condition. However, many uncontrollable factors cause the level of the catalyst columns to surge or the system to drift to an unbalanced condition. It is essential that a method and means be available for checking the level of the catalyst columns in order to determine if equilibrium conditions are being maintained in the moving catalyst system.

The prior art shows a number of catalyst level indicators, all of which have one or more defects which make them unsuitable for the purpose. For example, in one model a bob is lowered periodically to determine the catalyst level. In another, a screw type propeller is continuously rotated such that it seeks the level of the catalyst. Other more complicated installations are shown by the Swedish Patent No. 76,114. All of these designs have many moving parts which break down or jam in the catalyst, and they require continuous maintenance and often give erroneous readings.

A major object of this invention is the provision of a level indicator in a system wherein contact material is contacted as a substantially compact moving column with fluid reactants.

Another object of this invention is to provide a level indicator for measuring the level of particle-form material in a bin or hopper.

A further object of this invention is to provide means of measuring the height of particle-form material in an enclosed vessel in which no moving parts are utilized.

Figure 2:
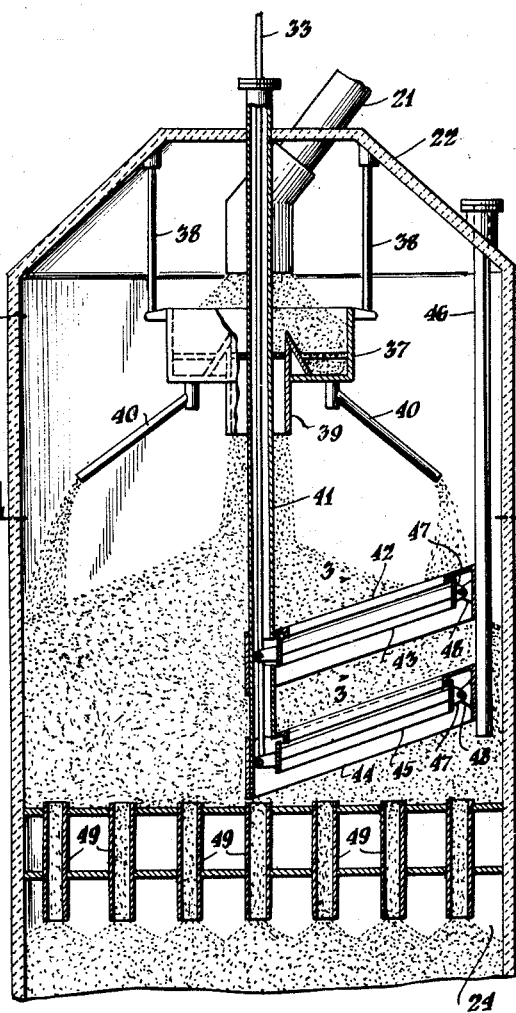

These and other objects of the invention will be made apparent by the following discussion of the invention. The drawings, which are a part of the specification, are referred to in this discussion by appropriate numbers. In these drawings, Figure 1 is an elevational view showing the general arrangement of a cyclic hydrocarbon conversion system of the type to which this invention pertains; Figure 2 is a vertical section of the surge chamber located in the upper section of a regeneration vessel; Figure 3 is a cross-sectional view of the catalyst troughs of this invention, taken on the plane 3—3 of Figure 2; Figure 4 is a sectional plan view of the surge hopper taken on the plane 4—4 of Figure 2; Figure 5 is a vertical sectional view showing the application of the invention to a circular catalyst storage hopper; Figure 6 is a plan view of the storage hopper taken on the plane 6—6 of Figure 5; Figure 7 is another cross-sectional view of a modified form of catalyst troughs; Figure 8 is a vertical sectional view of a storage bin showing another embodiment of the invention; Figure 9 is a vertical view of a portion of the embodiment shown on Figure 8 taken on plane 9—9 of Figure 8; Figure 10 is a typical calibration curve for the level indicator.

All of the above drawings are highly diagrammatic in form, intended only to simply the explanation of the invention.

Referring now to Figure 1 which shows a cyclic system for catalytically converting high boiling hydrocarbons, such as gas oil fractions, to gasoline and other products, catalyst, in particle-form, varying in size, for example, 4–20 mesh (Tyler Screen Analysis), passes from a supply hopper 10 downwardly through an elongated gravity feed leg 11 into the upper end of the reaction vessel 12. The catalyst moves downwardly through the vessel 12 as a substantially compact column while being contacted with hydrocarbon vapors introduced from the stock preparation system 13 of conventional type into the lower section of the vessel 12 via the conduit 14. The gaseous hydrocarbon products pass from the upper section of the vessel 12 through the conduit 15 to the product recovery system 16. The escape of hydrocarbons through the feed leg 11 is prevented by maintaining a blanket of an inert seal gas, such as steam or flue gas, within the upper end of the vessel 12. The seal gas is introduced through the conduit 17. Spent catalyst, bearing a carbonaceous deposit, is withdrawn from the lower end of vessel 12, through the conduit 18 at a suitable rate, controlled by the valve 19. The catalyst is purged substantially free of gaseous hydrocarbons before being withdrawn from the vessel 12 by means of an inert purge gas such as steam or flue gas, introduced at 48. The spent catalyst passes to the conveyor 20 by which it is conducted to the sloping supply duct 21 which supplies catalyst to the upper section of the regeneration vessel 22.

Regeneration vessel 22 comprises an upper catalyst surge chamber 23 and a communicating lower burning chamber 24. Air is introduced to the burning chamber 24 near its lower end through the conduit 25. The air moves upwardly through the column of gravitating catalyst particles in the burning chamber 24, burning the carbonaceous deposits on the surface of the catalyst. The flue gas formed by the burning is withdrawn from the vessel near the upper end of the chamber 24 through the conduit 26. A suitable heat exchange fluid is introduced into heat exchanger tubes (not shown) within the chamber 24 via the conduit 27. The fluid passes through the heat exchanger tubes to remove the excess heat of contaminant combustion from the catalyst and is withdrawn from the tubes via the conduit 28. Regenerated catalyst passes from the lower end of the chamber 23 via the conduit 29 to the conveyor 31 by which it is conducted to the downwardly sloping duct 32, supplying the hopper 10. The conveyors 20 and 31 may be of any suitable type adapted to transfer particle-form solids at elevated temperatures without excessive attrition, or a suitable gas lift may be used in place of the mechanical elevator. Both gas lifts and continuous bucket elevators have been found to be satisfactory for this purpose. It will be understood that the reactor and regenerator vessels may vary somewhat from the particular construction described hereinabove. For example, the regenerator may be of the multistage type comprising a vertical series of alternating burning and cooling zones, each burning zone having a separate gas inlet and outlet and each cooling zone having a separate set of heat transfer tubes therein and separate external manifold associated with said heat transfer tubes. And also the arrangement of the vessels may be varied from that described above. For example, the regeneration vessel may be located above the reaction vessel requiring only one catalyst lift or elevator, or the reaction and regeneration zones may be separated compartments of one elongated vessel.

The vertical rod 33 passes through the top of the regenerator 22 into the surge chamber, connecting with apparatus described hereinafter. The rod applies a force to the bellows 34. The bellows is filled with a suitable hydraulic incompressible fluid and the force is thereby transmitted through the conduit 35, by means of the fluid, to the indicator. The indicator is calibrated to read in feet above a certain datum, thereby indicating the height of the catalyst column in the surge chamber 23.

Referring to Figure 2, the method of varying the pull on the rod 33 in accordance with the height of catalyst column in the surge chamber will be disclosed. Catalyst is fed from the sloping supply duct 21 into a feeding box 37 located in the center and upper section of the surge chamber 23. The box is supported in position by rods 38 depending from the roof of the vessel. Within the box is located a large central outlet conduit 39 and a series of smaller outlet conduits 40, through which catalyst is fed to the outer regions of the vessel. By proper selection of central conduit area to smaller conduit area the angle of the catalyst level at the top of the catalyst column can be controlled and maintained constant.

The vertical tube 41 surrounds the rod 33 preventing catalyst from coming in contact with the rod 33. The members 42, 43 and 44, 45 form essentially superimposed pairs of troughs. The outer or lower trough members 42 and 44 are fastened rigidly at both ends to the tube 41 and support rod 46. The enclosed or upper trough members 43 and 45 are pivoted for rotation by means of the pin connected lugs 47, 48. The other ends are pin connected to the rod 33, adapted to oscillate as the rod 33 is raised or lowered. Although the inner or upper troughs are so pivoted that they are free to oscillate, it is important to notice at this point that substantially no movement of the inner trough is intended. Only the force on the rod 33 changes with the change in the amount of catalyst in the inner trough. This in turn varies with the height of the catalyst level in the surge hopper. The force on the rod 33 is counterbalanced by an equal and opposite force, thus keeping the inner trough substantially static, and giving a measure which may be correlated with the height of the catalyst column. The catalyst in the surge hopper passes downwardly through the connecting conduits 49 into the regeneration zone 24 located therebelow.

Referring now to Figure 3, the outer trough member is divided into two sections bolted together, an upper section 50 and a lower section 51. This trough is so constructed to enable the inner trough member to be installed. The upper section 50 of the outer trough forms a cover with a slot opening in the top. The cover reduces the catalyst load transmitted to the inner trough member 52. The catalyst fills the inner trough as indicated, the angle of the catalyst surface being that of the angle of repose of the catalyst. The inner trough has a slot opening in the bottom, permitting the catalyst to be withdrawn therethrough. The catalyst surface indicated at the outlet of the inner trough is also at the angle of repose of the catalyst. The catalyst is withdrawn from the apparatus through the slot opening in the bottom of the outer or lower trough. It is seen that the shape of the outer trough member prevents catalyst from packing in between the inner and outer troughs, thereby preventing the transfer of catalyst weight to the inner trough. The design also prevents force being applied to the inner trough by catalyst dragging along the outside surface. Substantially the only weight on the inner trough is the weight of the catalyst located in the trough. Confining of the catalyst at the entrance slot opening prevents transferring any substantial amount of the weight of the catalyst column above the opening. Likewise, confining of the catalyst across the outlet slot opening in the bottom of the inner trough prevents any substantial amount of the catalyst in the trough from receiving support from the column below the inner trough. The readings of column height are not affected substantially therefore by the fact that the column may be rising, falling, or static.

A set of these troughs having the general cross-sectional shape shown on Figure 3 were tested using commercial bead catalyst of 5–20 mesh (Tyler Screen Analysis). Figure 10 is a calibration curve obtained from the test data, showing smooth correlation between the indicated catalyst weight in the inner trough (the pull on rod 33) with the height of the catalyst column above a datum level. The tests showed that the readings were not materially affected by the fact that the catalyst was rising, falling, or stationary.

Figure 4 shows the location of the apparatus in the surge chamber 23 shown on Figure 2. The member 55 is an inverted V-shaped cover located above the trough slots to prevent catalyst from bouncing into the troughs and thereby giving false readings.

Referring to Figure 5, the invention is shown applied to a circular feed hopper, such as that located above the reactor 12 of Figure 1. For convenience, only one set of troughs is shown in this view. However, any number of sets can be used, one above the other, depending upon the height of catalyst to be measured. When using more than one set of troughs, the units are so spaced and set at such an angle, with respect to the angle of the catalyst column surface, that when the catalyst is emptied from the inner trough of one set, because of falling catalyst level, it will start to empty from the inner trough of the set located therebelow. By this procedure, a continuous reading is obtained over any selected range. The embodiment shown in Figure 5 discloses supporting both ends of the inner trough 52 on support rods 33, pivoted at both ends of the trough. The rods 33 are attached to eccentrics 60, 60, which are in turn attached to a rotatable rod 61. The rod 61 is supported at each end in suitable bearings 62, 62. The bearings 62, 62 are supported on a fixed table 63, which is fastened to the cover 64 of the hopper 10, by means of the support members 65, 65.

Referring to Figure 6, which shows a plan view of the hopper 10 from a position above the hopper, a platform balance 66 is shown for balancing the torque applied to the rod 61 by the weight of the partially filled inner trough 52. It is seen that one of the eccentrics 60 is part of an elongated balance beam. The adjustable counterweight 66 may be set to zero the apparatus when the inner trough is empty. When the trough contains catalyst, known weights are then applied to the balance to maintain equilibrium conditions. It is seen that there is substantially no movement of any of the parts of the apparatus of this invention.

Figure 7 discloses another form of trough construction in which the connecting bolts are all located on one side of the outer trough. The position of the inverted V-shaped protecting cover 55 is shown in this cross-sectional view of the apparatus.

Figure 8 discloses a modified form of the invention. The suspended inner member 70 has an inner chamber 71 with inclined feeding chutes 72 at equally spaced locations from top to bottom. The outer member 73 is rigidly attached to the vessel or bin 74 and has downwardly sloping conduits 75. The outlets of the conduits 75 are within the region confined by the chutes 72, but do not contact the chutes. Contact material surrounding the outer member passes through the conduits 75 into the chutes and then into the inner chamber 71 of the inner member 70. At the bottom of the inner member is located an outlet conduit 76 which feeds the contact material back to the bin or hopper. The rod 77 is connected to the inner member 70 by means of the pin 78 and lugs 79, 79. The bellows type chamber 80, located above the hopper 74, is filled with a non-compressible fluid through the conduit 81. The conduit is then sealed by closing the valve 82. The rod 77 is attached to the upper end wall of the bellows and transmits a force to the fluid, the amount depending upon how full the inner member is with catalyst. This force is transmitted by the fluid through the conduit 83 to suitable pressure recording means 84, shown diagrammatically. The pressure recorder can be calibrated to read directly in feet, giving a direct reading level indicator having a compact design, and also having the advantage of substantially no moving parts.

The Figure 9 shows a side view of the apparatus of Figure 8. The conduits 75 are shown of rectangular cross-section. However, other shapes could be used with equal success. Although the reading will not be continuous with the apparatus as shown, it could be made continuous by placing the conduits 75 at an angle with the horizontal so that the upper end of one conduit is above the lower end of the conduit located thereabove. If the conduits are placed close enough together, however, such a modification is found unnecessary for measuring the level of catalyst in hydrocarbon conversion apparatus. For example, in a commercial unit for installation in a typical hydrocarbon conversion system regeneration surge hopper, the apparatus shown on Figures 8 and 9 was found to give excellent results when the conduits 75 were placed on levels 3 inches apart. At normal discharge from the regenerator 22 and no feed to the hopper 23, the indicator showed a slight movement every 17 seconds, as the catalyst drained from each respective chute 72.

Although the apparatus has been described in connection with measuring the level of a catalyst column in a moving bed hydrocarbon conversion system, it is clear that it could be used with equal success to measure the height of a column of particle-form material other than commercial catalyst. The invention is not intended to be limited to the system disclosed, but only by following claims.

What is claimed is:

1. In combination a vertical vessel adapted for downward movement therethrough of a substantially compact bed of particle-form solid material, means located above the bed, for feeding solid material to the bed, at least one pair of super-imposed trough members open on top and located at least partially below the surface of the bed, said trough members each having a longitudinal slot at the bottom thereof, said trough members being located at an acute angle with respect to the horizon, the lower trough member having an upper section which surrounds the upper trough member and provides a cover therefor, said upper section possessing a slot in the uppermost portion above the upper trough member and substantially aligned with the slot in the upper trough member, means for supporting the lower trough member in a rigid position, pivot means for supporting the upper trough member at both ends, movable support members attached to the pivot means at each end of the upper trough member, and a weighing device supporting said movable support members adapted to indicate the height of the compact bed of particle-form material.

2. In combination a vertical vessel adapted for downward movement therethrough of a substantially compact bed of particle-form solid material, means located above the bed for feeding solid material to the bed, at least one pair of super-imposed trough members open on top and located at least partially below the surface of the bed, said trough members having a longitudinal slot at the bottom thereof, said trough members being located at an acute angle with respect to the horizon, the lower trough member having an upper section which surrounds the upper trough member and provides a cover therefor, said upper section possessing a slot in the uppermost portion above the upper trough member and substantially aligned with the slot in the upper trough member, means for supporting the lower trough member in a rigid position, pivot means for supporting the upper trough member at both ends, the pivot means at one end being supported in a fixed position, a movable support member attached to the pivot means at the other end, and a weighing device supporting said movable support member adapted to indicate the height of the substantially compact bed of particle-form material.

3. In combination a vertical vessel adapted for downward movement therethrough of a substantially compact bed of particle-form solid material, means located above the bed for feeding solid material to the bed, at least one pair of super-imposed trough members open on top and located at least partially below the surface of the bed, said trough mmebers having a longitudinal slot at the bottom thereof, the lower trough member having an upper section which surrounds the upper trough member and provides a cover therefor, said upper section possessing a slot in the uppermost portion above the upper trough member and substantially aligned with the slot in the upper trough member, means for supporting the lower trough member in a rigid position, pivot means for supporting the upper trough member at both ends, the pivot means at one end being supported in a fixed position, a movable support member attached to the pivot means at the other end, and a weighing device attached to said movable support member adapted to indicate the height of the substantially compact bed of particle-form material.

4. In combination a vertical vessel adapted for downward movement therethrough of a substantially compact bed of particle-form solid material, means located above the bed for feeding solid material to the bed, a vertical enclosed chamber rigidly fixed within said vessel, a series of downwardly and inwardly directed conduits projected through the wall of said rigidly-fixed chamber at equally spaced increments along the vertical length of the chamber, a movable enclosed chamber located within said rigidly-fixed chamber, funnel-shaped trough members located along the vertical outside length of said movable chamber at equally spaced increments and conducting with the interior of said movable chamber, the outlet of the downwardly directed conduits being adapted to feed particle-form material into the trough members which are located below the conduits, means defining an outlet in the bottom of said inner chamber and means defining an outlet in the bottom of said outer chamber, movable means for supporting the inner chamber, and a weighing device attached to said movable means adapted to indicate the downward pull of said movable inner chamber.

5. Apparatus for measuring the height of a column of particle-form material which comprises an outer vertical vessel, a series of downwardly and inwardly sloping conduits projected through the side wall of said outer vessel at equally spaced locations along the vertical length thereof, an inner vertical vessel located within said outer vessel, a series of chutes attached to the outside wall of said inner vessel at equally spaced locations along the vertical length thereof and communicating with the interior of said inner vessel, said sloping conduits adapted to feed particle-form material into said chutes, means defining an outlet from said inner vessel located in the bottom thereof and means defining an outlet from said outer vessel located in the bottom thereof, means for rigidly supporting the outer vessel in fixed position, movable means for supporting said inner vessel, and a weighing device supporting said movable means adapted to indicate the downward pull of said inner vessel and the particle-form material located therein.

6. Apparatus for measuring the height of a column of particle-form material in an enclosed vessel comprising a weighing rod extending downwardly into said vessel, a receptacle at least partially suspended from said weighing rod, said receptacle extending through a vertical portion of said vessel and occupying only a small portion of its cross section, said receptacle being open upwardly at a plurality of levels for receipt of solid flow from within said vessel and having an opening in its bottom for discharge of solids, a shield member arranged loosely around said receptacle and adapted to shield it from solid flow except for the locations of solid entry to and discharge from said receptacle, a recording instrument, a weight measuring device supporting said rod from its upper end and members operatively connecting said device to said recording instrument.

7. Apparatus for measuring the height of a column of particle-form material in an enclosed vessel comprising a weighing rod extending downwardly into said vessel, a receptacle at least partially suspended from said weighing rod, said receptacle extending through a vertical portion of said vessel and occupying only a small portion of its cross section, said receptacle being open upwardly at a plurality of levels for receipt of solid flow from within said vessel and having an opening in its bottom for discharge of solids, a shield member arranged loosely around said receptacle and adapted to shield it from solid flow except for the locations of solid entry to and discharge from said receptacle, and a weight measuring device supporting said weighing rod.

ERIC V. BERGSTROM.

(References on following page)

References Cited in the file of this patent

UNITED STATES PATENTS

| Number | Name | Date |
|---|---|---|
| 2,066,387 | Bigelow et al. | Jan. 3, 1937 |
| 2,398,334 | Sinclair et al. | Apr. 9, 1946 |
| 2,458,162 | Hagerbaumer | Jan. 4, 1949 |
| 2,529,843 | Kehrer | Nov. 14, 1950 |

FOREIGN PATENTS

| Number | Country | Date |
|---|---|---|
| 825,007 | France | Nov. 27, 1937 |
| 908,207 | France | Aug. 20, 1945 |

OTHER REFERENCES

"Measurment of solids in T. C. C. process," Kelley, The Petroleum Engineer, September, 1945, pages 136, 138, 142.